US012770473B2

(12) United States Patent
Peterson

(10) Patent No.: US 12,770,473 B2
(45) **Date of Patent: *Oct. 20, 2026**

(54) TRACKING QUANTITIES OF WINNING SYMBOLS FOR TRIGGERING ADDITIONAL SYMBOL EVALUATIONS

(71) Applicant: IGT, Las Vegas, NV (US)

(72) Inventor: Chris Peterson, Reno, NV (US)

(73) Assignee: IGT, Las Vegas, NV (US)

( * ) Notice: Subject to any disclaimer, the term of this patent is extended or adjusted under 35 U.S.C. 154(b) by 170 days.

This patent is subject to a terminal disclaimer.

(21) Appl. No.: 18/774,481

(22) Filed: Jul. 16, 2024

(65) Prior Publication Data

US 2024/0371236 A1 Nov. 7, 2024

Related U.S. Application Data

(63) Continuation of application No. 17/661,115, filed on Apr. 28, 2022, now Pat. No. 12,067,846.

(51) Int. Cl.
*G07F 17/32* (2006.01)

(52) U.S. Cl.
CPC ...... *G07F 17/3267* (2013.01); *G07F 17/3213* (2013.01); *G07F 17/3244* (2013.01)

(58) Field of Classification Search
CPC ............. G07F 17/3267; G07F 17/3213; G07F 17/3244; G07F 17/34
USPC ............................................................ 463/20
See application file for complete search history.

(56) References Cited

U.S. PATENT DOCUMENTS

| | | | |
|---|---|---|---|
| 6,958,013 | B2 | 10/2005 | Miereau et al. |
| 7,226,359 | B2 | 6/2007 | Bussick et al. |
| 7,473,174 | B2 | 1/2009 | Cuddy et al. |
| 7,666,089 | B2 | 2/2010 | Rodgers et al. |
| 7,789,747 | B2 | 9/2010 | Glavich et al. |
| 7,862,420 | B2 | 1/2011 | Peterson et al. |
| 8,231,454 | B2 | 7/2012 | Caputo |
| 8,257,162 | B2 | 9/2012 | Saito |
| 8,430,739 | B2 | 4/2013 | Rodgers |
| 8,734,222 | B2 | 5/2014 | Owen et al. |
| 8,734,224 | B2 | 5/2014 | Frank et al. |
| 8,777,724 | B2 | 7/2014 | Kennedy et al. |
| 8,814,654 | B2 | 8/2014 | Hoffman et al. |
| 8,827,796 | B2 | 9/2014 | Vermaak et al. |
| 8,894,481 | B2 | 11/2014 | Saunders et al. |
| 9,251,670 | B2 | 2/2016 | Aoki et al. |
| 9,430,913 | B2 | 8/2016 | Saunders et al. |
| 9,564,001 | B2 | 2/2017 | Owen et al. |
| 9,576,440 | B2 | 2/2017 | Keilwert |
| 9,805,553 | B2 | 10/2017 | Zielinski et al. |
| 9,922,497 | B2 | 3/2018 | Joung |
| 10,332,336 | B1 | 6/2019 | Halvorson |
| 10,553,068 | B2 | 2/2020 | Zehetner |
| 10,607,439 | B2 | 3/2020 | Caputo |
| 10,769,882 | B2 | 9/2020 | Uss et al. |
| 10,783,748 | B1 | 9/2020 | Peterson et al. |

(Continued)

*Primary Examiner* — Michael A Cuff
(74) *Attorney, Agent, or Firm* — Neal, Gerber & Eisenberg LLP

(57) ABSTRACT

Gaming systems and methods that track quantities of one or more tracked symbols that are part of winning symbol combinations in one or more plays of a game, and trigger one or more additional symbol evaluations responsive to one or more of the tracked quantities of such tracked symbols reaching one or more threshold quantities.

20 Claims, 13 Drawing Sheets

(56) References Cited

U.S. PATENT DOCUMENTS

| | | | |
|---|---|---|---|
| 10,896,568 B2 | 1/2021 | Pierer | |
| 11,011,025 B2 | 5/2021 | Pierer | |
| 11,189,137 B2 | 11/2021 | Hufnagl-Abraham | |
| 11,257,327 B1 * | 2/2022 | Sanborn | G07F 17/3258 |
| 2007/0287521 A1 | 12/2007 | Glavich et al. | |
| 2009/0124364 A1 | 5/2009 | Cuddy et al. | |
| 2010/0120505 A1 | 5/2010 | Caputo et al. | |
| 2011/0117989 A1 | 5/2011 | Kennedy et al. | |
| 2013/0196748 A1 | 8/2013 | Nicely et al. | |
| 2014/0018146 A1 | 1/2014 | Zielinski et al. | |
| 2014/0066166 A1 | 3/2014 | Saunders et al. | |
| 2016/0328909 A1 | 11/2016 | Joung | |
| 2019/0088077 A1 | 3/2019 | Zehetner | |
| 2021/0056801 A1 * | 2/2021 | Däumling | G07F 17/3244 |
| 2021/0056814 A1 | 2/2021 | Brown et al. | |
| 2021/0110657 A1 * | 4/2021 | Hiten | G07F 17/3244 |
| 2021/0264741 A1 | 8/2021 | Hufnagl-Abraham | |
| 2021/0319650 A1 | 10/2021 | Nelson et al. | |
| 2022/0335776 A1 * | 10/2022 | Mirjavadi | G07F 17/3213 |
| 2023/0050242 A1 * | 2/2023 | Bouvier | G07F 17/34 |

* cited by examiner

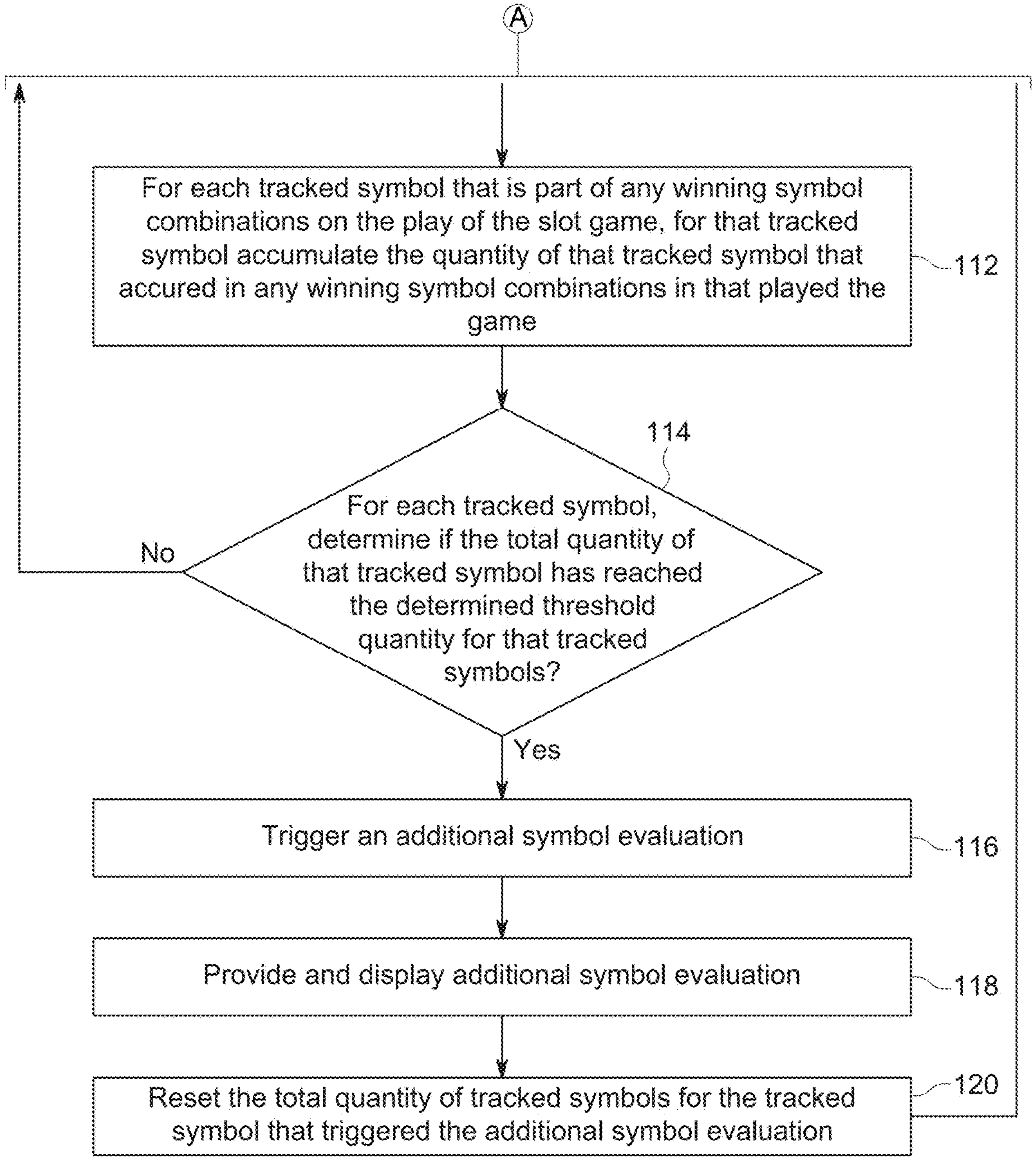
FIG. 1 (Continued...)

TRACKING QUANTITIES OF WINNING SYMBOLS FOR TRIGGERING ADDITIONAL SYMBOL EVALUATIONS

PRIORITY

This application is a continuation of, claims priority to and the benefit of U.S. patent application Ser. No. 17/661,115, filed on Apr. 28, 2022, the entire contents of which is incorporated herein by reference.

BACKGROUND

The present disclosure relates to tracking quantities of winning symbols for triggering additional symbol evaluations for gaming environments.

Gaming machines may provide players awards in primary games. Gaming machines generally require the player to place or make a wager to activate the primary or base game. The award may be based on the player obtaining a winning symbol or symbol combination and on the amount of the wager.

BRIEF SUMMARY

In various embodiments, the present disclosure relates to a gaming system including a processor and a memory device that stores a plurality of instructions that, when executed by the processor in association with a play of a game, cause the processor to randomly determine a plurality of symbols, communicate data that results in a display, by a display device, of the plurality of symbols, determine any awards associated with any winning symbol combinations formed by the plurality of symbols, and communicate data that results in a display, by the display device, of any determined awards. The plurality of instructions, when executed by the processor further cause the processor to, responsive to any of the winning symbol combinations comprising a tracked symbol, add a quantity of occurrences of the tracked symbol in any of the winning symbol combinations to a tracked quantity of the tracked symbol. The plurality of instructions, when executed by the processor further cause the processor to, responsive to the tracked quantity of that tracked symbol reaching a threshold quantity for the tracked symbol, communicate data that results in a display, by the display device, of a replacement of each of a plurality of the occurrences of the tracked symbol of the displayed plurality of symbols with a replacement symbol, determine any additional awards associated with the displayed plurality of symbols comprising the displayed replacement symbols, and communicate data that results in a display, by the display device, of any determined additional awards.

In various other embodiments, the present disclosure relates to a gaming system including a processor and a memory device that stores a plurality of instructions that, when executed by the processor in association with a play of a game, cause the processor to randomly determine a plurality of symbols, communicate data that results in a display, by a display device, of the plurality of symbols, determine any awards associated with any winning symbol combinations formed by the plurality of symbols, and communicate data that results in a display, by the display device, of any determined awards. The plurality of instructions, when executed by the processor further cause the processor to, responsive to any of the winning symbol combinations comprising any of a plurality of different tracked symbols, for each such tracked symbol, add a quantity of occurrences of that tracked symbol in any of the winning symbol combinations including that tracked symbol to a tracked quantity of that tracked symbol. The plurality of instructions, when executed by the processor further cause the processor to, responsive to any of the tracked quantities of the tracked symbols reaching a threshold quantity for that tracked symbol, communicate data that results in a display, by the display device, of a replacement of each of a plurality of that tracked symbol with a replacement symbol, determine any additional awards associated with the displayed plurality of symbols comprising the displayed replacement symbols, and communicate data that results in a display, by the display device, of any determined additional awards.

In various other embodiments, the present disclosure relates to a gaming system including a processor and a memory device that stores a plurality of instructions that, when executed by the processor in association with a play of a game, cause the processor to communicate data that results in a display, by a display device, of a plurality of reels, randomly determine a plurality of symbols from a plurality of different symbols on the reels, the plurality of different symbols comprising a tracked symbol, communicate data that results in a display, by the display device, of the plurality of symbols on the reels, determine any awards associated with any winning symbol combinations on the reels formed by the displayed plurality of symbols on the reels, and communicate data that results in a display, by the display device, of any determined awards. The plurality of instructions, when executed by the processor further cause the processor to, responsive to any of the winning symbol combinations on the reels comprising the tracked symbol, add a quantity of occurrences of the tracked symbol on the reels that are in any of the winning symbol combinations on the reels to a tracked quantity of the tracked symbol. The plurality of instructions, when executed by the processor further cause the processor to, responsive to the tracked quantity of the tracked symbol reaching a threshold quantity for the tracked symbol, communicate data that results in a display, by the display device, of a replacement of each occurrence of the tracked symbols on the reels that are in any of the winning symbol combinations with a wild replacement symbol, determine any additional awards associated with the displayed plurality of symbols on the reels that comprise the displayed wild replacement symbols, and communicate data that results in a display, by the display device, of any determined additional awards.

Additional features are described herein, and will be apparent from the following Detailed Description and the figures.

DETAILED DESCRIPTION

Figure 1:
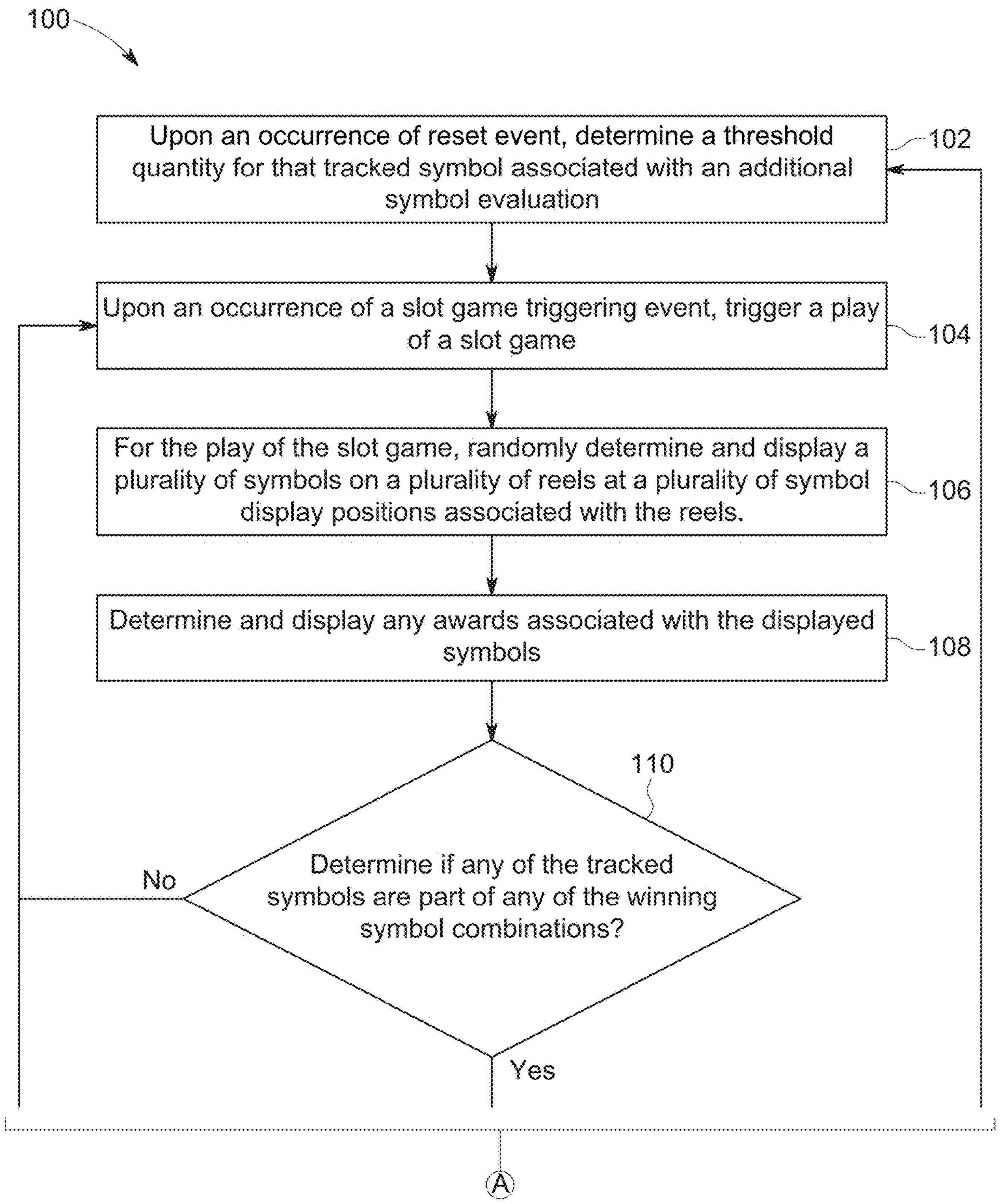
FIG. 1 is a flow chart an example process for operating a gaming system that tracks quantities of winning symbols for triggering additional symbol evaluations.

In various embodiments, the present disclosure relates to gaming systems and methods that track quantities of one or more symbols that are part of winning symbol combinations in one or more plays of a game, and that trigger one or more additional symbol evaluations responsive to one or more of the tracked quantities of such symbols reaching one or more threshold quantities. The symbols that are tracked are referred to herein as tracked symbols. In various embodiments, the gaming systems and methods can separately track quantities of one or more tracked symbols. In various embodiments, the tracking of the quantities of the tracked symbols persists over multiple plays of the game. In various embodiments, the gaming system and method can cause a display of the tracked quantities of each of the tracked symbols and the threshold quantities.

In various embodiments, for a play of a slot game, the gaming system determines and displays a game outcome (including a plurality of randomly determined symbols) as well as any awards associated with the game outcome (based on the randomly determined and displayed symbols). The gaming system additionally tracks the quantities of each of one or more tracked symbols and specifically each of the occurrences of each of one or more tracked symbols that are part of one or more winning symbol combinations in the play of each game. For example, for a play of a slot game including multiple reels and multiple different symbols on those reels, the gaming system randomly determines and displays a game outcome for the play of the slot game that includes a plurality of randomly determined symbols of the reels. For the play of the game, the gaming system determines any awards for the displayed randomly determined symbols on the reels, displays such determined awards (if any), and provides such determined awards (if any) to the player. For the play of the game, the gaming system also determines for each of one or more tracked symbols, if any of the winning symbol combinations (that resulted in such determined awards) include that tracked symbol and the quantity of occurrences of that tracked symbol in each such winning symbol combination. For the play of the game, the gaming system further, for each of one or more tracked symbols, adds the quantity of occurrences of that tracked symbol in such winning symbol combinations to a counter for that tracked symbol. For the play of the game, the gaming system further determines, for each tracked symbol, if the quantity of that tracked symbol has reached a threshold quantity for that tracked symbol; and responsive to the quantity of that tracked symbol reaching the threshold quantity for that tracked symbol, the gaming system triggers one or more additional symbol evaluations associated with that tracked symbol. For the play of the game, the additional symbol evaluation(s) includes: (1) for the tracked symbol that reached the threshold quantity for that tracked symbol, replacing each displayed occurrence of that tracked symbol in each such winning symbol combination including that tracked symbol with a replacement symbol such as a wild symbol in such winning symbol combination; (2) conducting another award evaluation of the displayed symbols for that play of the game with such tracked symbols replaced by such replacement symbols (such as the replacement wild symbols); and (3) resetting the quantity of tracked symbols for the tracked symbols that reaches the threshold quantities for those tracked symbols. For the play of the game, the gaming system determines any additional awards for the updated displayed symbols including the replacement symbols (such as the replacement wild symbols) on the reels, displays such determined additional awards (if any), and provides such determined additional awards (if any) to the player.

In various embodiments, for each play of the game, responsive to none of the quantities of the tracked symbols reaching the respective threshold quantities for those tracked symbols, the gaming system enables another play of the slot game. In these embodiments, for each such tracked symbol, the tracked quantity of that track symbols persist for subsequent use in association with that next play of the slot game. In other words, while one or more of the tracked symbols in association with a current play of the slot game may not cause a triggering of an additional symbol evaluation for that play of the game, the tracked quantities of such tracked symbols are retained for one or more subsequent determinations of whether to cause any additional symbol evaluations in one or more subsequent plays of the game.

In various embodiments, for each play of the game, responsive to the gaming system determining that a tracked quantity of a tracked symbol reaches a threshold quantity and after the gaming system provides one or more additional symbol evaluations associated with that tracked symbol, the gaming system resets the total quantity of that tracked symbol to a base or reset quantity (such as zero). In these embodiments, the gaming system does not reset the total quantity of any of the other tracked symbols. In these embodiments, the reaching of the threshold quantity for one tracked symbol, does not affect the tracking of one or more of the other tracked symbols.

In various other embodiments, for each play of the game, responsive to the gaming system determining that a tracked quantity of a tracked symbol reaches a threshold quantity and after the gaming system provides one or more additional symbol evaluations associated with that tracked symbol, the gaming system resets the total quantity of that tracked symbol to a base or reset quantity (such as zero), and the total quantity of one or more or all of the other tracked symbols to a base or reset quantity (such as zero). In these embodiments, the reaching of the threshold quantity for one tracked symbol also affects the tracking of one or more or all of the other tracked symbols.

While various embodiments described herein are directed to tracking quantities of tracked symbols in association with one or more plays of a primary game, such as a primary slot game, it should be appreciated that such embodiments can additionally or alternatively be employed in association with tracking quantities of tracked symbols in association with one or more plays of a secondary game, such as but not limited to bonus free games.

While the example embodiments described herein are directed to tracking quantities of tracked symbols in plays of a slot game, it should be appreciated that such embodiments can be alternatively employed in association with tracking quantities of tracked symbols in association with non-slot games, such as, but not limited to, card games, keno games, or bingo games.

While various embodiments described below are directed to the gaming system tracking quantities of tracked symbols and providing additional symbol evaluations that are displayed by an electronic gaming machine ("EGM") in the form of a slot machine, it should be appreciated that such embodiments can additionally or alternatively be employed in association with a gaming system tracking symbols and providing additional symbol evaluations that are displayed by a video poker machine, a video lottery terminal, a terminal associated with an electronic table game, a terminal associated with a live table game, a video keno machine, a video bingo machine, a sports betting terminal that also offers sports betting opportunities, a personal gaming device such as a desktop computer, a laptop computer, a tablet computer or computing device, a personal digital assistant, a mobile telephone, and/or other mobile computing device that offer plays of games (and in certain instances, sports betting opportunities).

While various embodiments described herein relate to the gaming system displaying a credit balance, a wager, and any awards as an amount of monetary credits or currency, in other embodiments, one or more of such credit balance, such wager, and any awards provided to such a player can be for non-monetary credits, promotional credits, and/or player tracking points or credits.

FIG. 1 is a flowchart of an example process or method 100 of operating the gaming system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds can be changed, certain of the illustrated blocks or diamonds can be optional, or certain of the illustrated blocks or diamonds may not be employed.

In this example embodiment, upon an occurrence of a reset event for a tracked symbol, the gaming system determines a threshold quantity for that tracked symbol associated with an additional symbol evaluation, as indicated in block 102. In various embodiments, the reset events for the track symbols can all occur together or can occur individually for each of the track symbols or for one or more groups of the tracked symbols. In various embodiments, the reset events for the track symbols can occur upon an initiation of the gaming system, such as following the gaming system powering up or otherwise being reset. In various embodiments, the reset events for the tracked symbols can occur upon the initiation of a gaming session, such as upon the gaming system moving from an idle state to an active state. In various embodiments, a reset event can occur for a tracked symbol responsive to an occurrence of an additional symbol evaluation for that tracked symbol. In various embodiments, a reset event can occur for a tracked symbol responsive to an occurrence of an additional symbol evaluation for another tracked symbol. In various embodiments, the reset events for all of the tracked symbols can occur responsive to an occurrence of an additional symbol evaluation for one of tracked symbol. It should be appreciated that the quantity of tracked symbols for play of the game can vary in accordance with the present disclosure.

In various embodiments, the threshold quantities for each tracked symbols can be static or can vary. In the embodiments where the threshold quantities are static, the step of determining the threshold quantities can possibly be skipped because such threshold quantities are always the same. In various embodiments, the threshold quantities for each tracked symbols can be the same or can be different for two or more of the threshold quantities. It should be appreciated that the higher the determined threshold quantity for a tracked symbol, the longer, on average, between triggers of the additional symbol evaluation for that tracked symbol, and conversely the lower the determined threshold quantity for a tracked symbol, the shorter, on average, between triggers of the additional symbol evaluation for that tracked symbol. As such, the determination of the threshold quantity for each tracked symbol can at least in part be a partial determination of the volatility of the gaming system for the plays of the game.

Following the determination of a threshold quantity and in this embodiment upon an occurrence of a slot game triggering event, the gaming system triggers a play of a slot game, as indicated in block 104. In various embodiments wherein the slot game is provided as a primary game, the slot game triggering event occurs upon a placement of a wager by a player on a play of the slot game. In various embodiments wherein the slot game is a secondary game, the slot game triggering event occurs based on a displayed event associated with a play of a primary game. In various embodiments wherein the slot game is a secondary game, the slot game triggering event occurs based on an event independent of any displayed event associated with the play of the primary game.

For the play of the slot game, the gaming system randomly determines and then displays a plurality of symbols on a plurality of reels at a plurality of symbol display positions associated with the reels, as indicated in block 106. In various embodiments, the gaming system can, for each displayed track symbol display the tracked quantity of symbols for that tracked symbol. The display be can be directly associated with each of the displayed tracked symbol (such as on the reels adjacent to the displayed tracked symbols on the reels) or can be indirectly associated the tracked symbols such as but not limited to being in a table or meter displayed adjacent to the reels.

After randomly determining and displaying the plurality of symbols, the gaming system determines and displays any awards associated with the displayed symbols for the play of the slot game, as indicated in block 108. In these embodiments, the gaming system determines any awards associated with the displayed symbols based on: (1) the paytable for the play of the slot game, (2) the wager for the play of the slot game, and (3) one or more different symbol evaluation methods. These symbols evaluation methods can, for example, include a payline symbol evaluation method, a ways to win symbol evaluation method, and/or or a scatter pay symbol evaluation method. The gaming system determines any awards based on the paytable, wager, the specific evaluation method(s), and the displayed symbols. As part of this award determination, the gaming system can determine the all of the symbols include the tracked symbols that are part of any winning symbol combinations. As part of this award determination and display by the gaming system, the gaming system can display a corresponding award for each winning symbol combination.

In addition to determining and displaying any awards associated with the displayed symbols, the gaming system determines if any of the tracked symbols are part of any of the winning symbol combinations for the play of the slot game, as indicated in diamond 110. Responsive to the gaming system determining that none of the tracked symbols are part of any of the winning symbol combinations, the gaming system returns to block 104 and awaits another occurrence of a slot game triggering event. In various embodiments, the lack of occurrence of any tracked symbols that are part of any winning symbol combinations in a play of a slot game has no effect on the tracked quantities of the tracked symbols. In various other embodiments, one or more of the track quantities of tracked symbols can persist for a limited period of time and/or a limited quantity of plays of the slot game, and thus no occurrence of tracked symbols in a play of a slot game can have an effect on the tracked quantities of the tracked symbols in those embodiments.

For each tracked symbol that is part of any winning symbol combination in the play of the slot game, for that tracked symbol the gaming system accumulates the quantity of that tracked symbol that occurred in any of the winning symbol combinations in that play of the game, as indicated by block 112. For example, responsive to one winning symbol combination including three occurrences of a tracked symbol, the gaming system adds three to the tracked quantity of that tracked symbol. In another example, responsive to one winning symbol combination including five occurrences of a tracked symbol, the gaming system adds five to the tracked quantity of that tracked symbol. In another example, responsive to two overlapping winning symbol combinations including one of the winning symbol combinations including four occurrences of a tracked symbol and the other winning symbol combinations including five occurrences of a tracked symbol, the gaming system adds nine to the tracked quantity of that tracked symbol. Thus, in various embodiments, the gaming system counts the shared tracked symbol twice because it is in two different winning symbol combinations. In various other embodiments, the gaming system counts such shared tracked symbol in two different winning symbol combinations only once.

As mentioned above, in various embodiments, the gaming system determines and displays a tracked symbol meter or counter for each tracked symbol or a table showing the quantities of occurrences of each tracked symbol. In various embodiments, the gaming system displays a numerical indication for each the tracked symbols such that the player is aware of a total quantity of each of the tracked symbols. In various embodiments, the gaming system displays a numerical indication for the threshold quantity for each tracked symbol such that the player is aware of the threshold quantity for each of the tracked symbols.

For each tracked symbol, the gaming system determines if a total tracked quantity of that tracked symbol has reached the determined threshold quantity for that tracked symbol, as indicated in diamond 114. That is, the gaming system determines for each tracked symbol whether the triggering condition associated with that tracked symbol has occurred (such as whether the meter for that tracked symbol indicates the quantity of tracked symbols is at least equal to the threshold quantity for that tracked symbol associated with the additional symbol evaluation for that tracked symbol). As mentioned above, it should be appreciated that the threshold quantity for each tracked symbol can be the same or can be different for two or more of the tracked symbols.

Responsive to the gaming system determining that the total quantity of tracked symbols for each of the tracked symbols has not reached the determined threshold quantity for that tracked symbol, the gaming system returns to block 104 without triggering any additional symbol evaluations for any of the tracked symbols.

Responsive to the gaming system determining that the total quantity of tracked symbols for any of the tracked symbols has reached the determined threshold quantity for that tracked symbol, the gaming system triggers and provides an additional symbol evaluation using that tracked symbol, as indicated blocks 116 and 118.

Following the triggering and providing of the additional symbol evaluation, the gaming system resets the total quantity of tracked symbols for the tracked symbol that triggered the additional symbol evaluation, as indicated by block 120. The gaming system then returns to block 102 to determine another threshold quantity of tracked symbols for that tracked symbol. Alternatively, if the threshold quantity is always the same, the gaming system can return to block 104. Additionally or alternatively, for each of the other tracked symbols that have reached the determined threshold quantity for that tracked symbol, the gaming system can provide an additional symbol evaluation for that additional tracked symbol in the same manner.

In various embodiments, the additional symbol evaluation for a tracked symbol can vary. In this example embodiment, the additional symbol evaluation for a tracked symbol includes replacing each occurrence of that displayed tracked symbol with a replacement symbol such as a replacement wild symbol in each of the one or more winning symbol combinations that include that tracked symbol for the play of the game, and conducting another award evaluation with such tracked symbols replaced by such replacement symbols such as the wild symbols. For the play of the game, the gaming system determines any additional awards for the displayed symbols including the replacement symbols such as the replacement wild symbols on the reels, displays any such determined additional awards, and provides such additional awards to the player.

FIGS. 2A, 2B, 2C, 2D, 2E, 2F, and 2G illustrate screen displays of portions of an example play of a primary wagering slot game of one embodiment of the present disclosure on a gaming system such as an EGM (such as an EGM described below). In this example, the EGM displays via display device 200 (such as a display device described below) adjacently arranged video reels 210, 220, 230, 240, and 250 and different symbols (not labeled) on the video reels 210, 220, 230, 240, and 250. For each play of the slot game, the reels 210, 220, 230, 240, and 250 are configured to display a plurality of different symbols at respective symbol display positions (not labeled).

It should be appreciated that these displays can vary in accordance with the present disclosure, and that the EGM can cause the display of additional game play related information. For example, the EGM can causes the display device 200 to display: (1) a credit meter that displays the player's credit balance; (2) a wager display that displays any wagers placed on plays of the primary wagering slot game; (3) a win display that displays any awards won for each play of the primary wagering slot game; and (4) a message box configured to display messages before, during, or after each play of each game. In various embodiments, the EGM indicates the player's credit balance, the player's wager, and any awards provided to the player in the form of amounts of credits; however, it should be appreciated that such indications can alternatively or additionally be made in the form of amounts of currency, points, or the like.

Figure 2A:
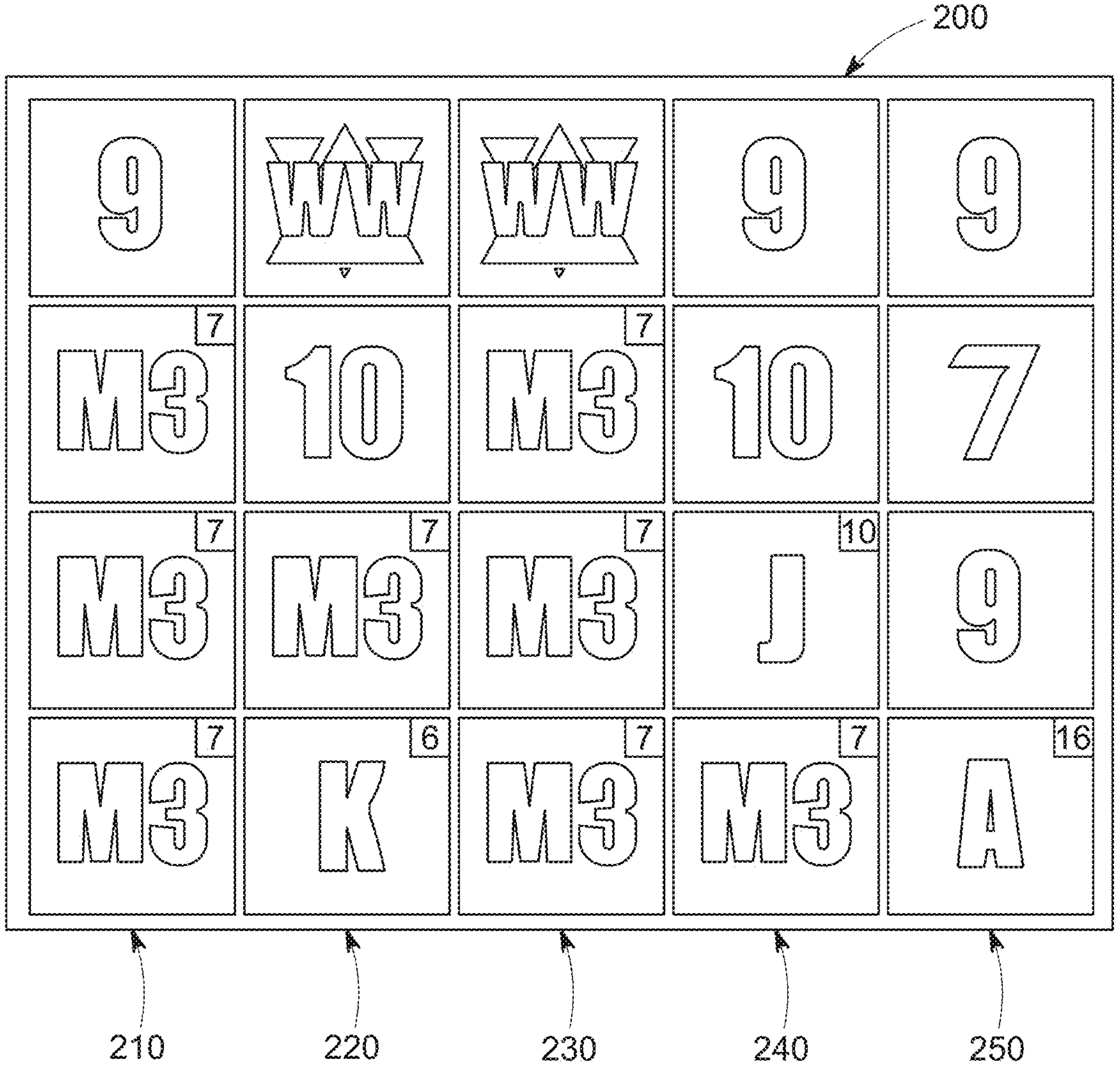
FIGS. 2A, 2B, 2C, 2D, 2E, 2F, and 2G are front views of example screens displays displayed by a gaming system of one example embodiment of the present disclosure illustrating a play of a slot game wherein the gaming system tracks quantities of certain symbols when they part of winning symbol combinations for triggering additional symbol evaluations.

As shown in FIG. 2A, a play of primary wagering slot game has been triggered on the EGM, the EGM has randomly determined and displayed a plurality of symbols on the reels 210, 220, 230, 240, and 250 at respective symbol display positions. In this example, the following symbols on the reels are tracked symbols: (1) M3; (2) A; (3) K; (4) Q; and (5) J.

In this example, the EGM displays the tracked quantity of symbols in a meter associated with and adjacent to each displayed tracked symbol. In this example, at this point in the play of the game before the EGM has determined any winning symbol combinations: (1) each displayed occurrence of the M3 is associated with a meter that indicates that 7 M3 symbols have been tracked from one or more previous plays of the game; (2) each displayed occurrence of the A symbol is associated with a meter that indicates that 16 A symbols have been tracked from one or more previous plays of the game; (3) each displayed occurrence of the K symbol is associated with a meter that indicates that 6 K symbols have been tracked from one or more previous plays of the game; and (4) each occurrence of the J symbol is associated with a meter that indicates that 10 J symbols have been tracked from one or more previous plays of the game. Even though the Q symbol is a tracked symbol, since the Q symbol did not occur in the play of the game, the EGM does not display the tracked quantity of the Q symbol.

As mentioned above, the EGM can additionally display the threshold quantity for each tracked symbols in association with the symbol or in another suitable manner such as in a table. In this example embodiment, the EGM is not displaying the threshold quantities for each tracked symbols. In this example embodiment, the threshold quantities for each of the tracked symbols is different, although two or more of the threshold quantities can alternatively be the same. In this example embodiment: (1) the threshold quantity for the tracked M3 symbol is 17; (2) the threshold quantity for the tracked A symbol is 30; (3) the threshold quantity for the tracked K symbol is 25; (4) the threshold quantity for the tracked Q symbol is 20; and (5) the threshold quantity for the tracked J symbol is 15. In this example embodiment, at the end of the prior play of the slot game and at this point in the current play of the game, none of the tracked quantities of symbols have reached the respective threshold quantities for those tracked symbols.

Figure 2B:
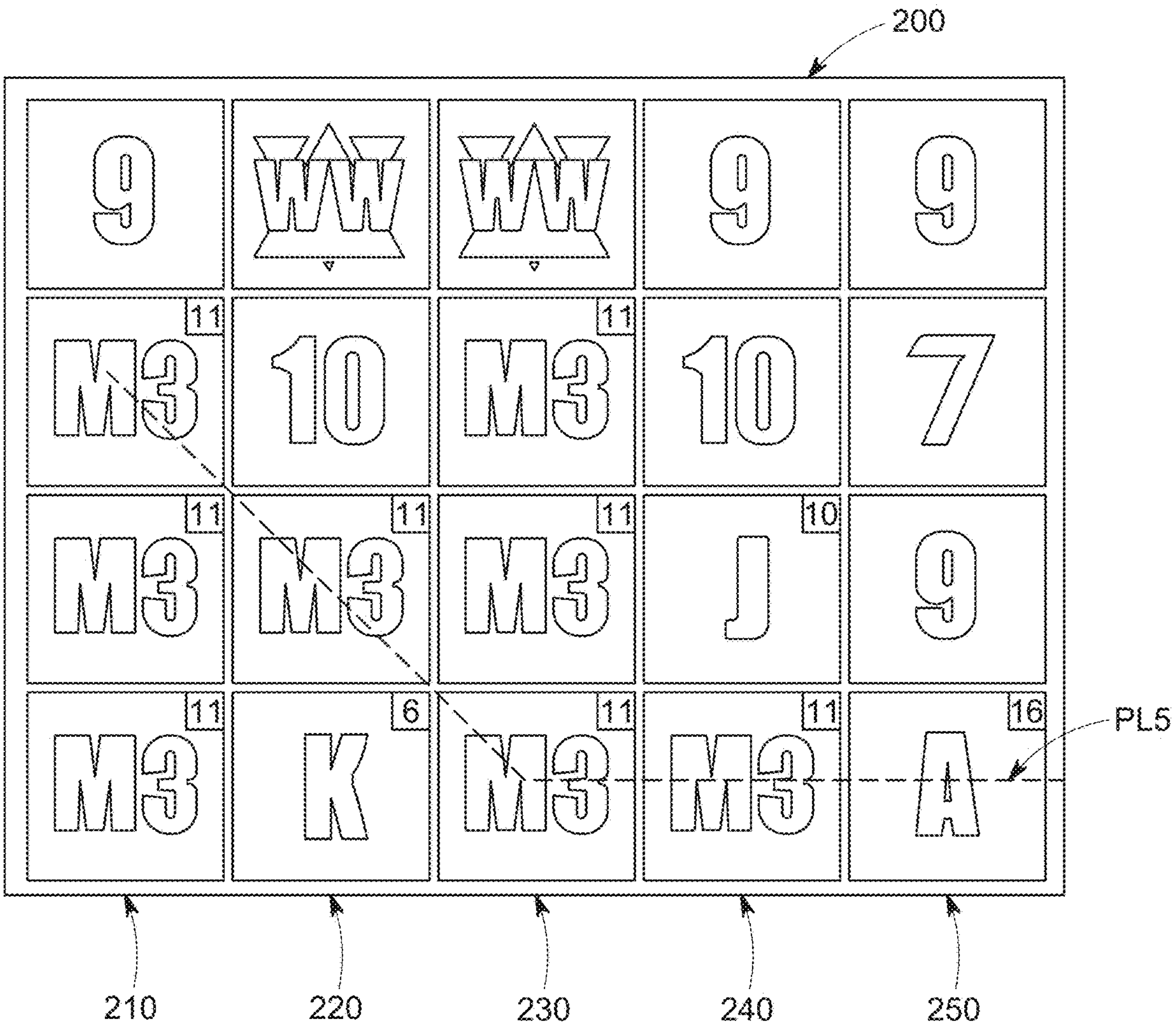

FIG. 2B shows a subsequent point in the play of the game where the EGM is evaluating the displayed symbols for winning combinations along the paylines. Specifically, FIG. 2B shows that the EGM has: (1) evaluated the displayed symbols along payline PL5; (2) determined that 4 M3 symbols are a winning symbol combination along payline PL5; (3) provided an award of 500 credits to the player for the 4 M3 winning symbol combination along payline PL5; (4) suitably displayed the award of 500 credits (not shown); and (5) increased the tracked quantity meter associated with each occurrence of the M3 symbol by the quantity of 4 (from 7 to 11) based on the 4 occurrences of the M3 symbol in this winning symbol combination along payline PL5. In other words, the gaming system determines the quantity of occurrences the M3 tracked symbol in the winning symbol combination and adds that to the tracked quantity of the M3 tracked symbol. The EGM has not changed any of the tracked quantities of the other tracked symbols. Specifically, even though the A symbol occurred on payline PL5, the EGM did not increase the quantity of tracked A symbols because that occurrence of the A symbol was not part of the winning symbol combination. In alternative embodiments, the EGM could count this occurrence of the A symbol as part of a winning symbol combination and increase the tracked quantity meter associated with the A symbol because that A symbol can be deemed to be part of the winning combination along payline PL5 or because that A symbol occurred along a winning payline. In this example embodiment, at this point in the play of the game, none of the tracked quantities of symbols have reached the respective threshold quantities for those tracked symbols.

Figure 2C:
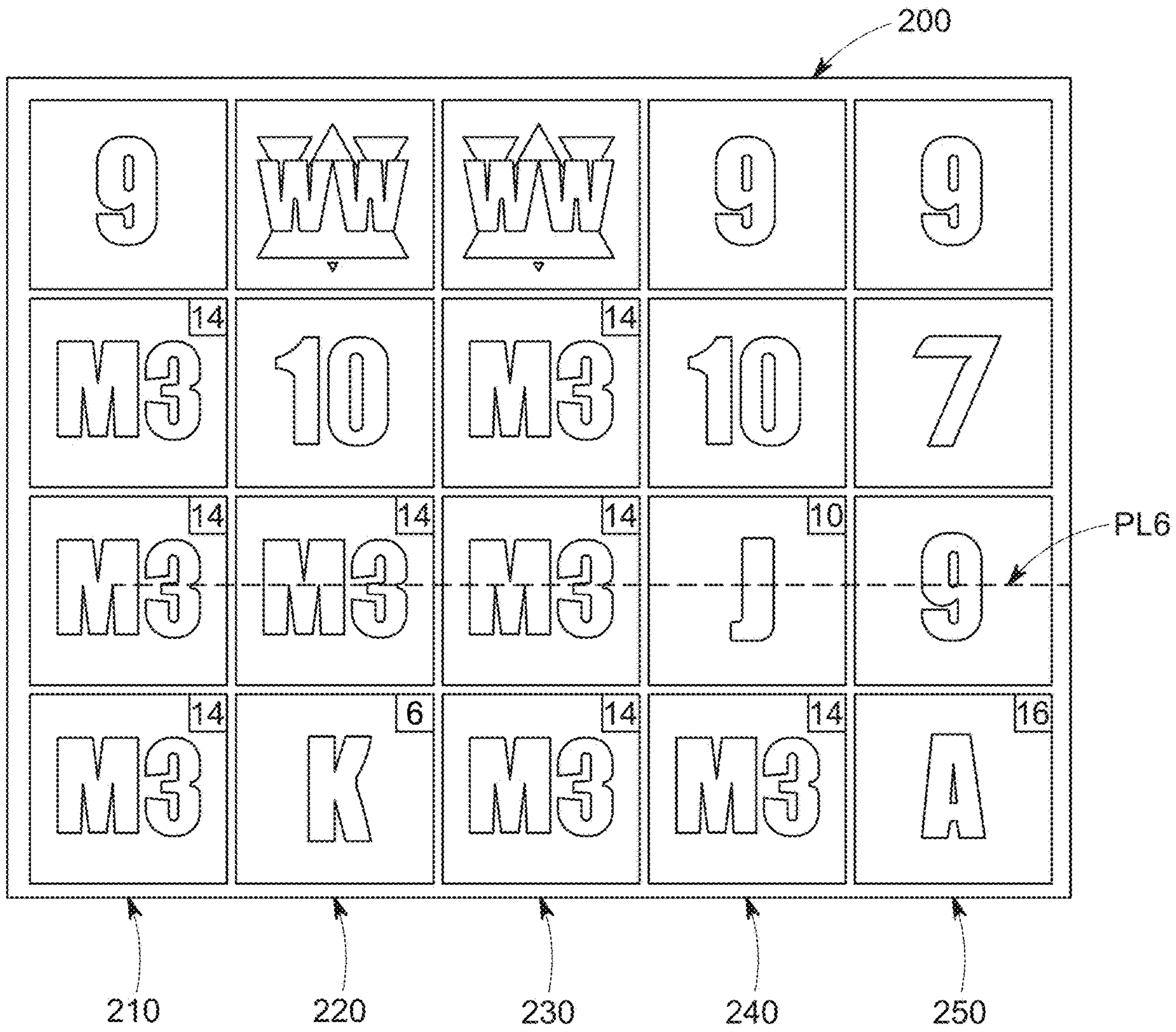

FIG. 2C shows a subsequent point in the play of the game where the EGM is evaluating the displayed symbols for winning combinations along the paylines. Specifically, FIG. 2C shows that the EGM has: (1) evaluated the displayed symbols along payline PL6; (2) determined that 3 M3 symbols are a winning symbol combination along payline PL6; (3) provided an award of 250 credits to the player for the 3 M3 winning symbol combination along payline PL6; (4) suitably displayed the award of 250 credits (not shown); and (5) increased the tracked quantity meter associated with each occurrence of the M3 symbol by the quantity of 4 (from 11 to 14) based on the 3 occurrences of the M3 symbol in this winning symbol combination along payline PL6. In other words, the gaming system determines the quantity of occurrences the M3 tracked symbol in this winning symbol combination and adds that to the tracked quantity of the M3 tracked symbol. The EGM has not changed any of the tracked quantities of the other tracked symbols. Specifically, even though the J symbol occurred on payline PL6, the EGM did not increase the quantity of tracked J symbols because that occurrence of the J symbol was not part of the winning symbol combination. In alternative embodiments, the EGM could count this occurrence of the tracked J symbol as part of a winning symbol combination and increase the meter associated with the J symbol because that J symbol can be deemed to be part of the winning combination along payline PL6 or because that J symbol occurred along a winning payline. In this example embodiment, at this point in the play of the game, none of the tracked quantities of symbols have reached the respective threshold quantities for those tracked symbols.

Figure 2D:
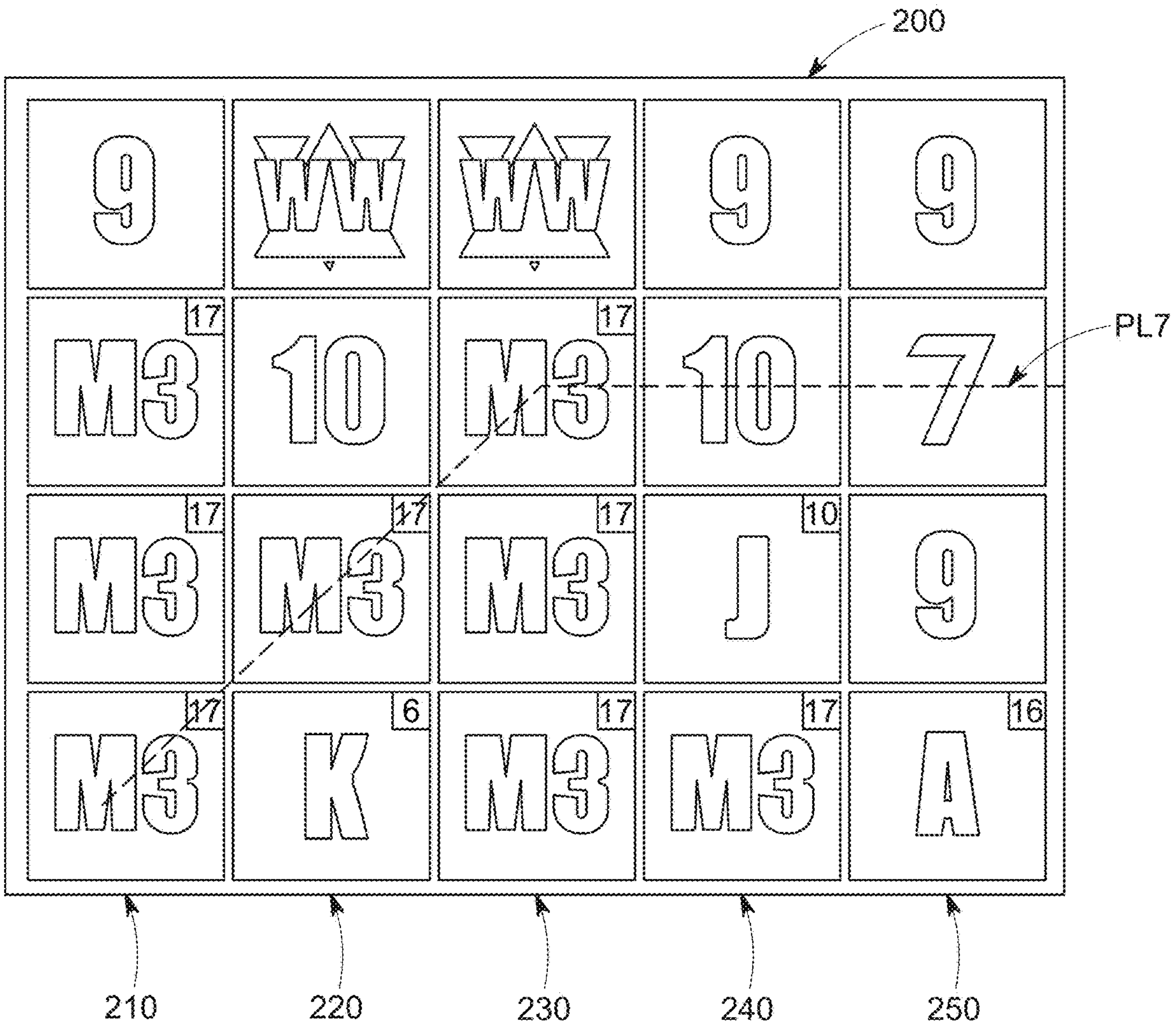

FIG. 2D shows a subsequent point in the play of the game where the EGM is evaluating the displayed symbols for winning combinations along the paylines. Specifically, FIG. 2D shows that the EGM has: (1) evaluated the displayed symbols along payline PL7, (2) determined that 3 M3 symbols are a winning symbol combination along payline PL7, (3) provided an award of 250 credits to the player for the 3 M3 winning symbol combination along payline PL7, (4) suitably displayed the award of 250 credits (not shown); and (5) increased the tracked quantity meter associated with each occurrence of the M3 symbol by the quantity of 4 (from 11 to 14) based on the 3 occurrences of the M3 symbol in this winning symbol combination along payline PL6. In other words, the gaming system determines the quantity of occurrences the M3 tracked symbol in this winning symbol combination and adds that to the tracked quantity of the M3 tracked symbol. The EGM has not changed any of the tracked quantities of the other tracked symbols. In this example embodiment, at this point in the play of the game, the tracked quantity of the M3 symbol has reached the threshold quantity of 17 for that tracked symbol. Thus, the EGM determined to provide the additional award evaluation.

Figure 2E:
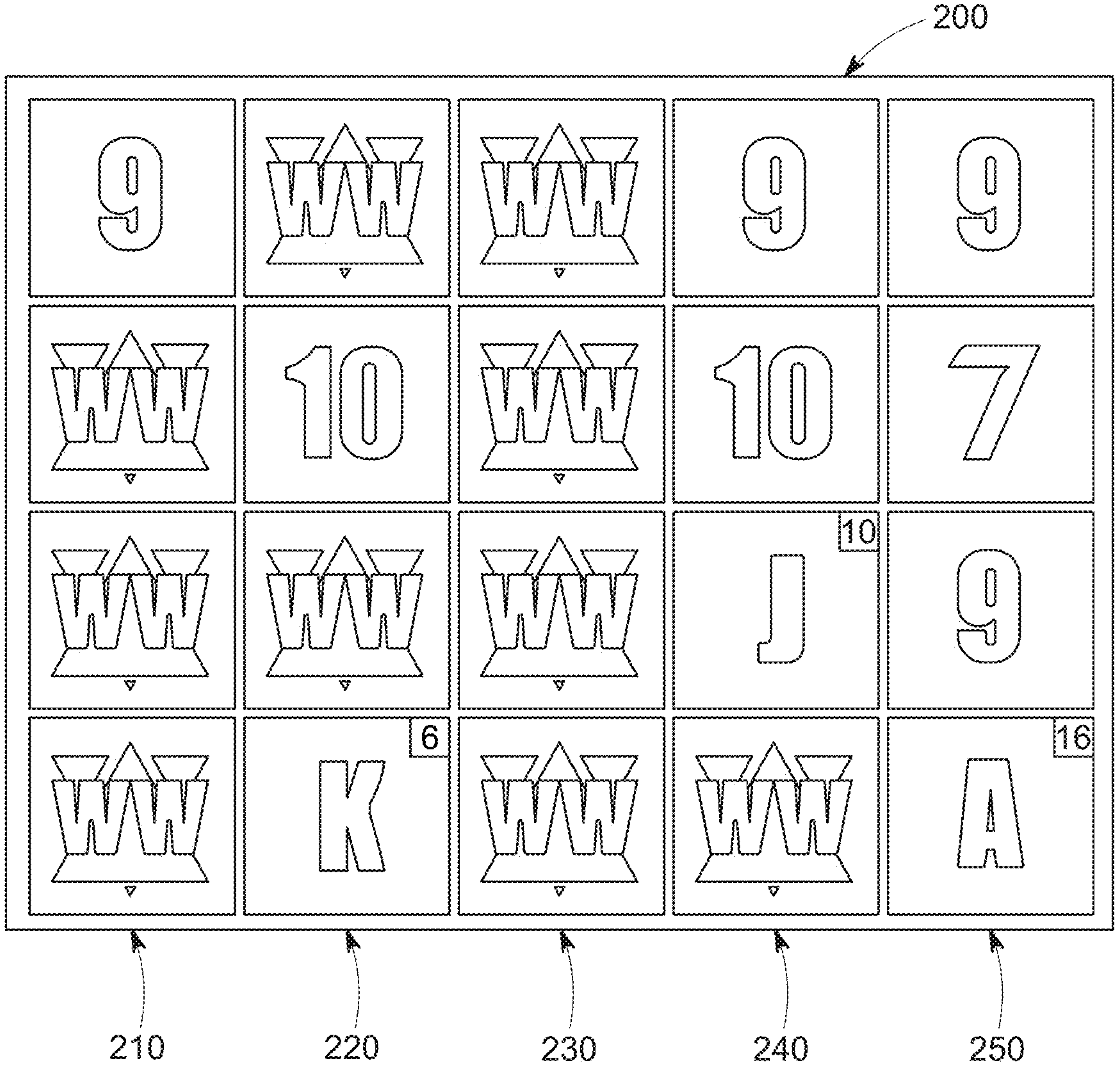

FIG. 2E shows a subsequent point in the play of the game where the EGM has started the additional award evaluation. The first part of this example additional award evaluation includes the EGM replacing the display of each of the occurrences of the 3M tracked symbol on each reel (that triggered the additional award evaluation) with a wild replacement symbol on the reel. In this example embodiment, each instance of the 3M symbol is replaced by a replacement wild symbol.

Figure 2F:
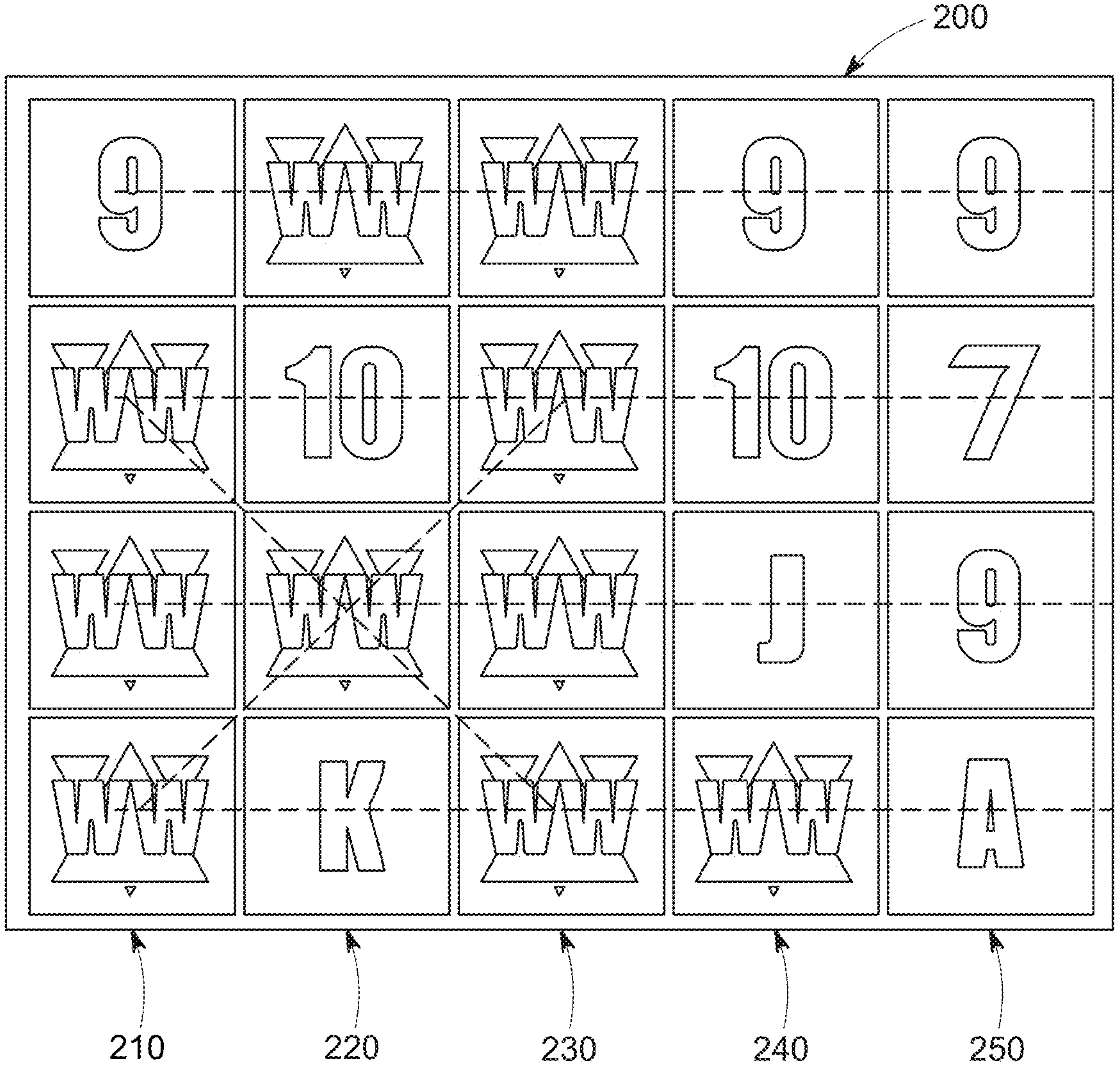

FIG. 2F shows a subsequent point in the play of the game where the EGM has completed the second part of the additional award evaluation. The second part of this example additional award evaluation includes the EGM evaluating each of the paylines for any winning symbol combinations. The EGM evaluates all of the displayed symbols including all of the displayed wild replacement symbols. The EGM determines the additional awards, displays the additional awards, and provides the additional awards to the player.

Figure 2G:
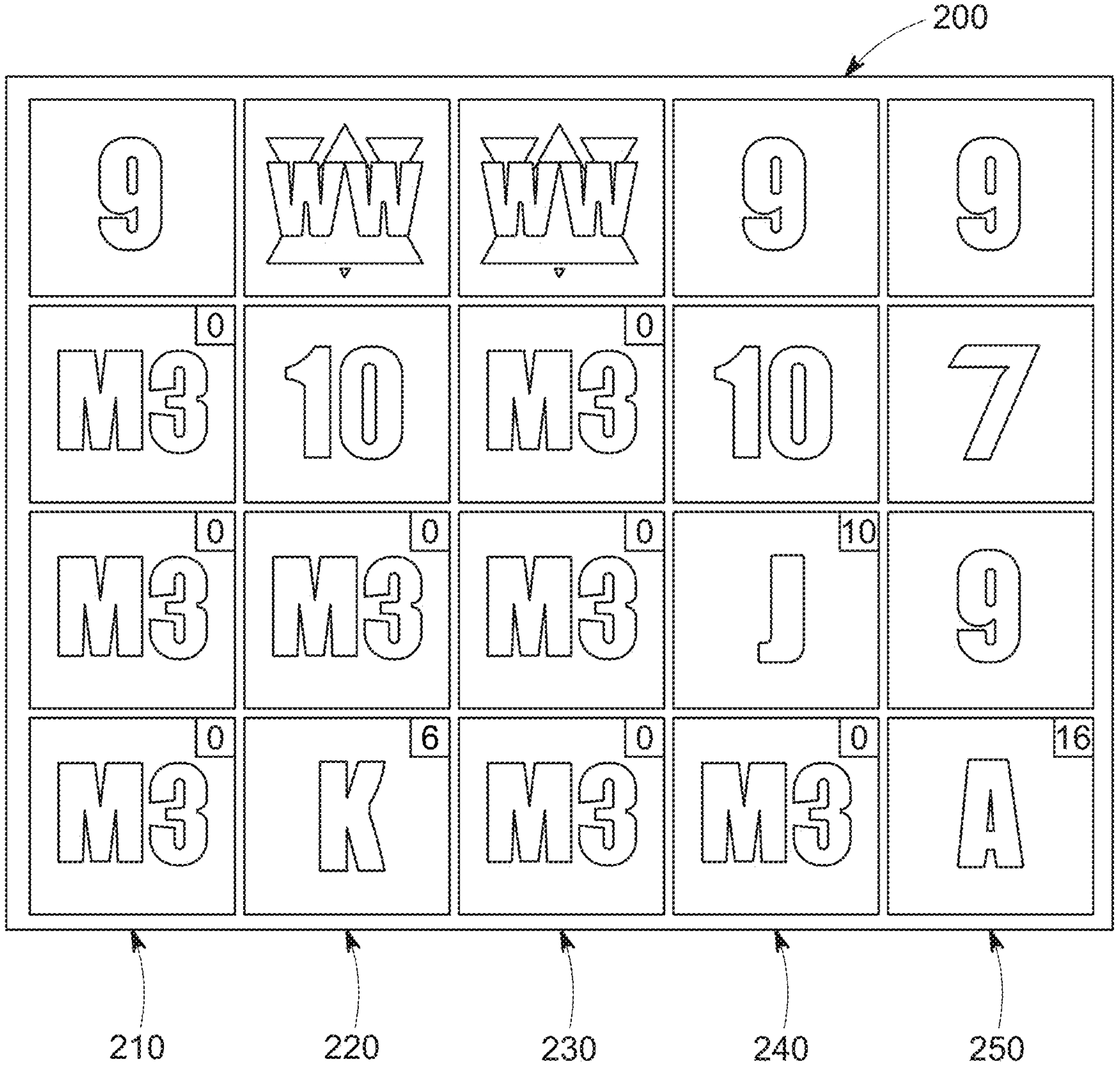

FIG. 2G shows a subsequent point in the play of the game where the EGM has completed the additional award evaluation. In this example, the EGM has replaced all of the wild replacement symbols with the original 3M symbols and has reset the tracked quantity of the 3M symbols to 0 for the next play of the game. In this example embodiment, the tracked quantities of the other A, K, Q, and J tracked symbols have not changed. In this example embodiment, none of the tracked quantities of symbols have reached the respective threshold quantities for those tracked symbols and the EGM ends the play of the game.

It should be appreciated from the above that responsive to any of the winning symbol combinations including a tracked symbol, the gaming system can add a quantity of occurrences of that tracked symbols in all of the winning symbol combinations to the tracked quantity of that tracked symbol.

It should be appreciated from the above that responsive to the tracked quantity of a tracked symbol not reaching the threshold quantity for that tracked symbol, the gaming system can enable a subsequent play of the game wherein the tracked quantity of that track symbol persist for the subsequent play of the game.

It should be appreciated from the above that responsive to the tracked quantity of a tracked symbol reaching the threshold quantity for the tracked symbol, the gaming system can reset the tracked quantity of that track symbol for a subsequent play of the game.

It should be appreciated from the above that the gaming system can cause a display of the tracked quantity of a tracked symbol before and during the play of the game.

It should be appreciated from the above that the threshold quantity for a tracked symbol can be greater than a quantity of that tracked symbol that can occur in a single play of the game.

It should further be appreciated that in different embodiments, one or more of: which symbols are tracked, the threshold quantity for each tracked symbol, and/or any determination disclosed herein is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a user's selection, determined independent of a user's selection, determined based on one or more side wagers placed, determined independent of one or more side wagers placed, determined based on the user's primary game wager, determined independent of the user's primary game wager, determined based on time (such as the time of day), determined independent of time (such as the time of day), determined based on an amount of coin-in accumulated in one or more pools, determined independent of an amount of coin-in accumulated in one or more pools, determined based on a status of the user (i.e., a player tracking status), determined independent of a status of the user (i.e., a player tracking status), determined based on one or more other determinations disclosed herein, determined independent of any other determination disclosed herein or determined based on any other suitable method or criteria.

The above-described embodiments of the present disclosure can be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more servers; (b) one or more electronic gaming machines such as those located on a casino floor; and/or (c) one or more personal gaming devices. Thus, in various embodiments, the gaming system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the gaming system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a server through a data network.

In certain embodiments in which the gaming system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the gaming system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the gaming system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the gaming system includes a server and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a user before enabling that user to place any wagers on any plays of any wagering games. In one example, the server identifies the user by requiring a user account of the user to be logged into via an input of a unique username and password combination assigned to the user. The server may, however, identify the user in any other suitable manner, such as by validating a player tracking identification number associated with the user; by reading a player tracking card or other smart card inserted into a card reader (as described below); by validating a unique user identification number associated with the user by the server; or by identifying the EGM (or personal gaming device), such as by identifying the MAC address or the IP address of the Internet facilitator. In various embodiments, once the server identifies the user, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for users to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with users.

Figure 3:
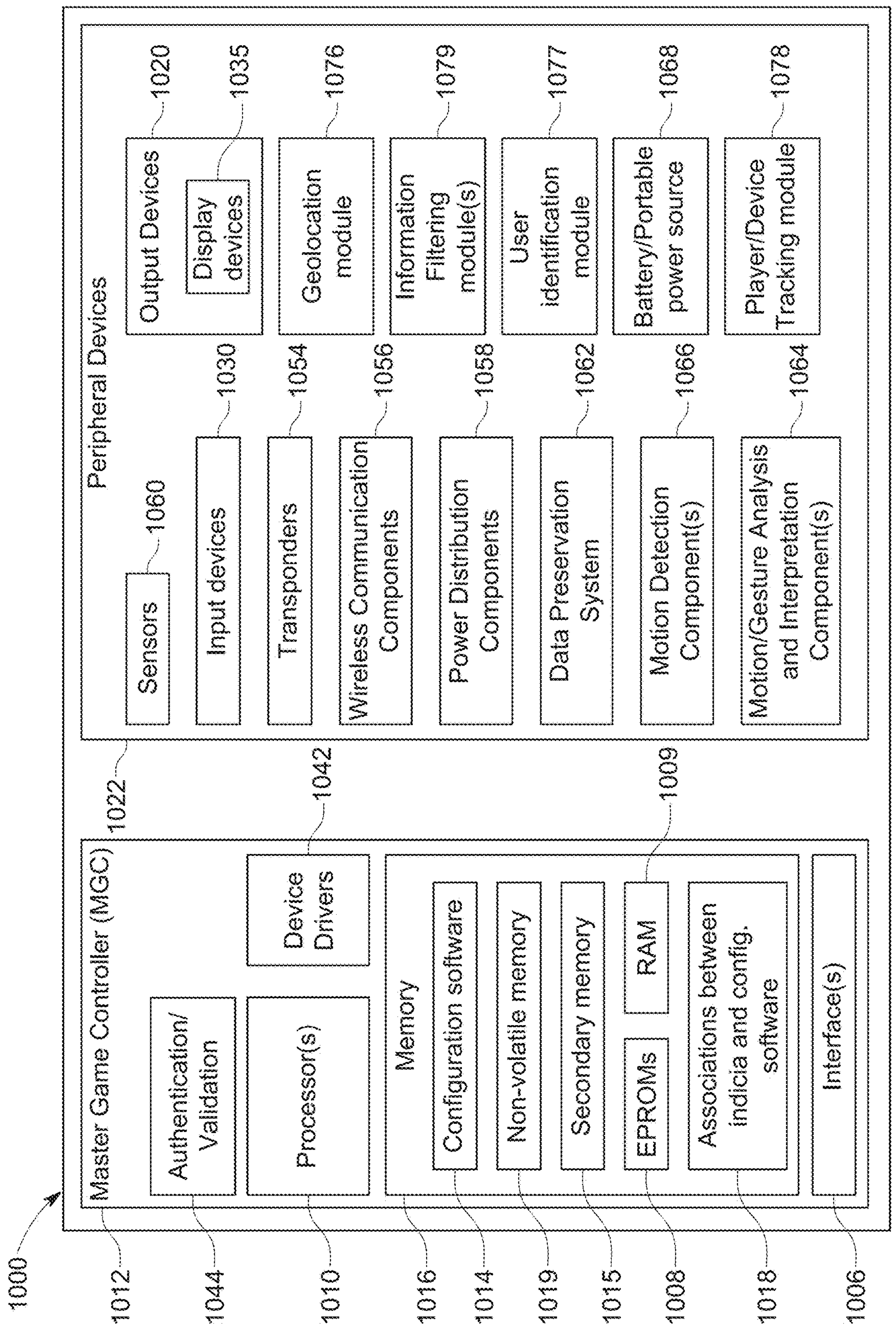
FIG. 3 is a schematic block diagram of one embodiment of an electronic configuration of an example electronic gaming machine of the present disclosure.
Figure 4A:
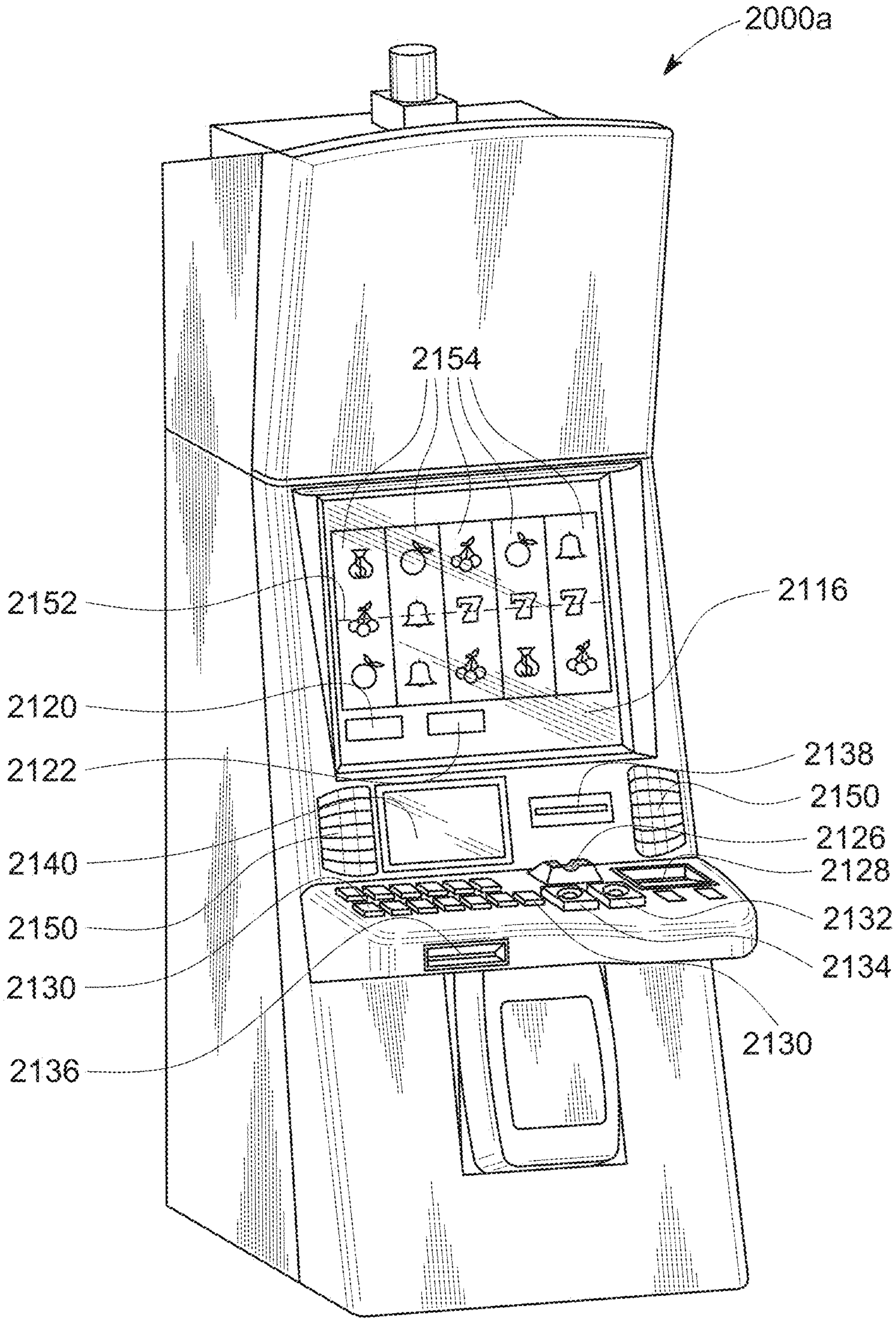
FIGS. 4A and 4B are perspective views of example alternative embodiments of an electronic gaming machine of the present disclosure.
Figure 4B:
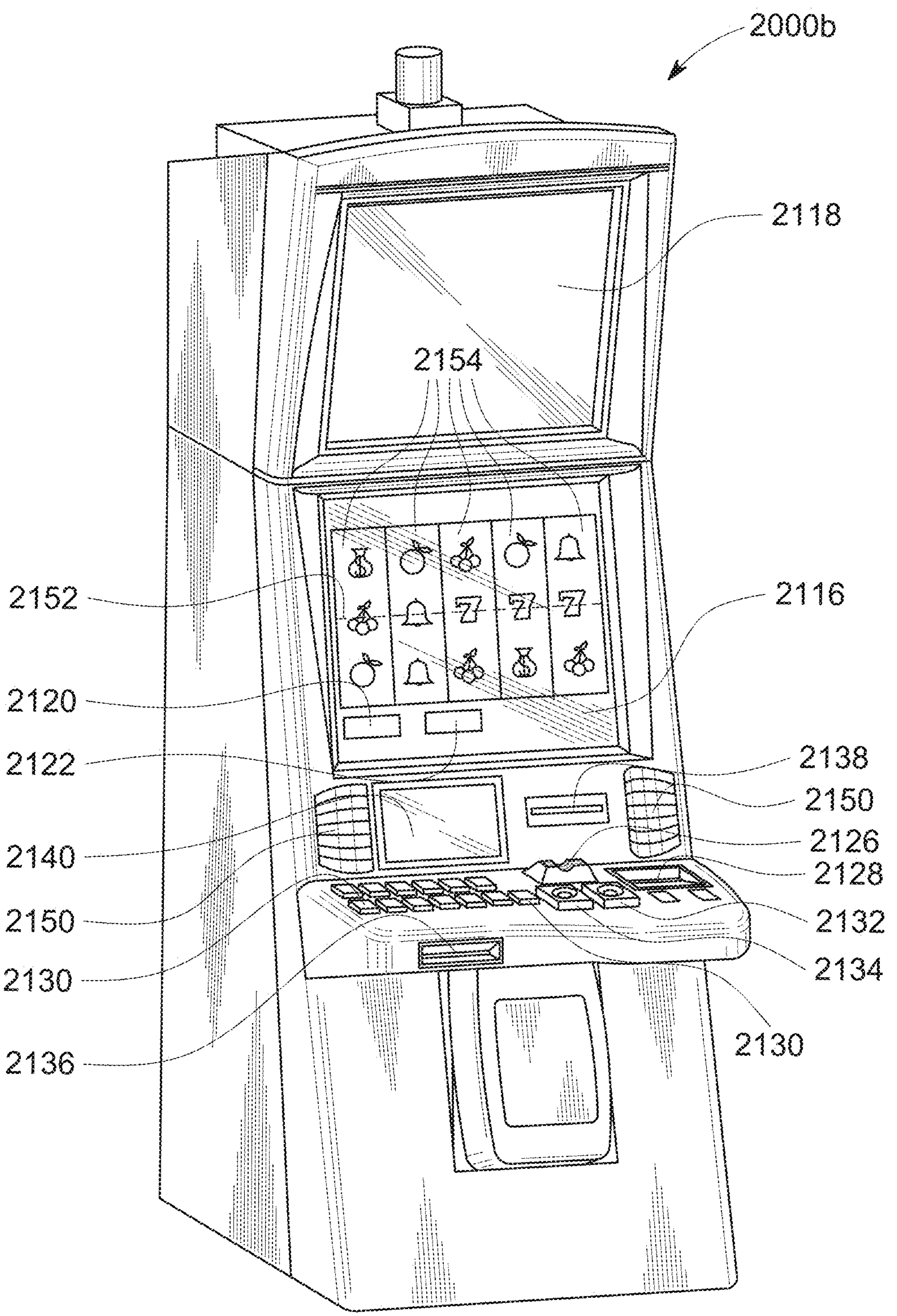

FIG. 3 is a block diagram of an example EGM 1000 and FIGS. 4A and 4B include two different example EGMs

Figure 4C:
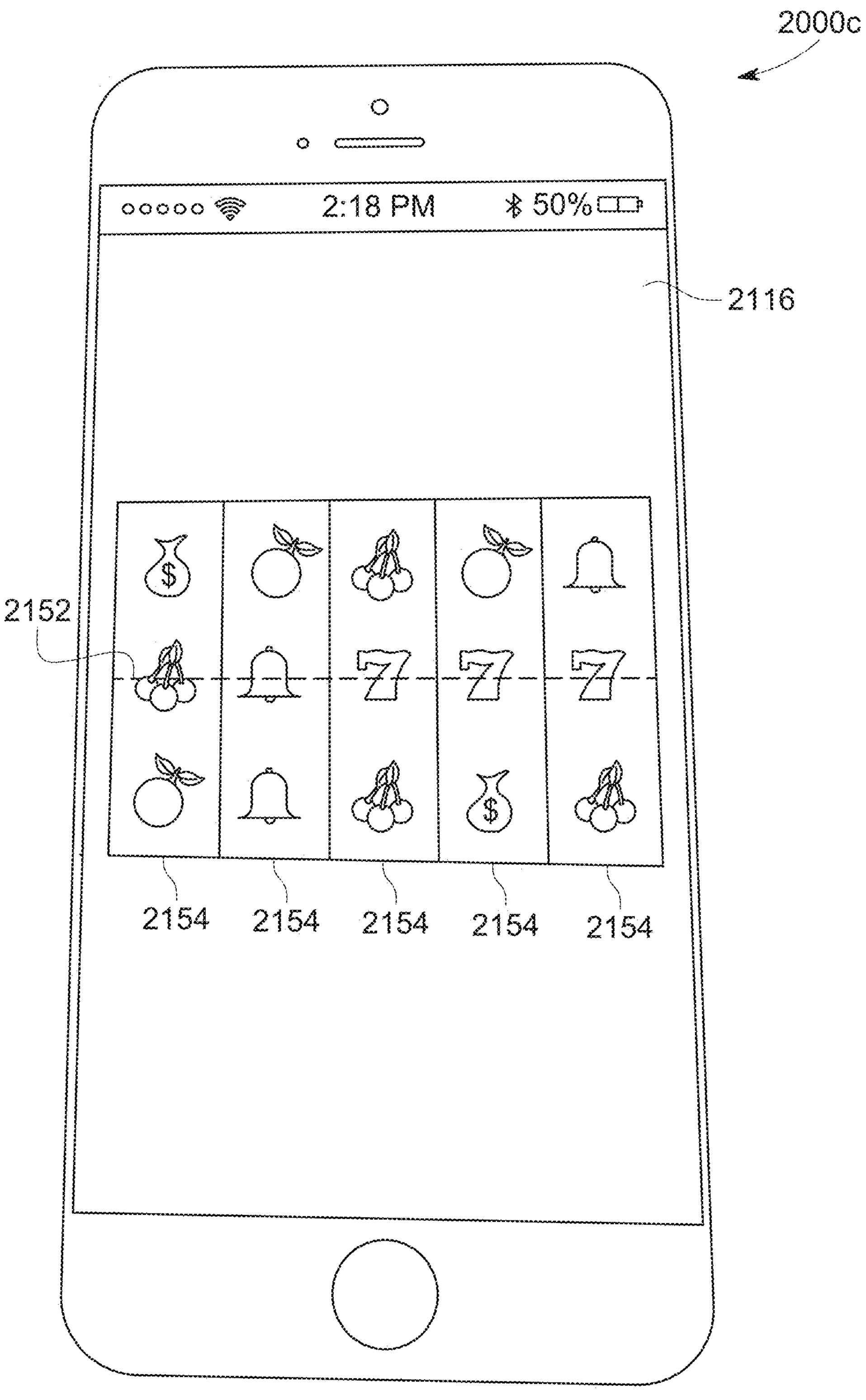
FIG. 4C is a front view of an example personal gaming device of the present disclosure.

2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one user/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a user's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the user. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136.

In certain embodiments, rather than dispensing bills, coins, or a physical ticket having a monetary value to the user following receipt of an actuation of the cashout device, the payout device is configured to cause a payment to be provided to the user in the form of an electronic funds transfer, such as via a direct deposit into a bank account, a casino account, or a prepaid account of the user; via a transfer of funds onto an electronically recordable identification card or smart card of the user; or via sending a virtual ticket having a monetary value to an electronic device of the user.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract users to the EGM. In certain embodiments, the EGM displays a sequence of audio and/or visual attraction messages during idle periods to attract potential users to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a user identification card reader into which a user identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a user, such as a mobile phone, a radio frequency identification tag, or any other suitable wired or wireless device, to retrieve relevant information associated with that user to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a user appropriately funds the EGM and places a wager, the EGM activates the game play activation device to enable the user to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a user and the user has a positive (i.e., greater-than-zero) credit balance, the EGM initiates a payout associated with the user's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a user identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., users, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected user movements and/or gestures to determine appropriate user input information relating to the detected user movements and/or gestures. For example, in one embodiment, the at least one motion/gesture analysis and interpretation component 1064 is configured to perform one or more of the following functions: analyze the detected gross motion or gestures of a user; interpret the user's motion or gestures (e.g., in the context of a casino game being played) to identify instructions or input from the user; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a user may operate it while standing or sitting. In various embodiments, the EGM is positioned on a base or stand, or is configured as a pub-style tabletop game (not shown) that a user may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a user; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a user.

As generally explained above, in various embodiments in which the gaming system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the gaming system includes a real-time or online accounting and gaming information system configured to communicate with the server. In this embodiment, the accounting and gaming information system includes: (a) a user database configured to store user profiles, (b) a player tracking module configured to track users (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 4B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of user excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a “BONUS” symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a “secondary game meter” configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple “buy-in.” For example, qualification through other specified activities is unsuccessful, payment of a fee or placement of an additional wager “buys-in” to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable users of those EGMs to work in conjunction with one another, such as by enabling the users to play together as a team or group, to win one or more awards. In other such embodiments, the EGMs enable users of those EGMs to compete against one another for one or more awards. In one such embodiment, the EGMs enable the users of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a user’s gaming activity. In one such embodiment, the player tracking system does so through the use of player tracking cards. In this embodiment, a user is issued a user identification card that has an encoded user identification number that uniquely identifies the user. When the user’s playing tracking card is inserted into a card reader of the gaming system to begin a gaming session, the card reader reads the user identification number off the player tracking card to identify the user. The gaming system timely tracks any suitable information or data relating to the identified user’s gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more users, the player tracking system includes the user's account number, the user's card number, the user's first name, the user's surname, the user's preferred name, the user's player tracking ranking, any promotion status associated with the user's player tracking card, the user's address, the user's birthday, the user's anniversary, the user's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the user must first access a gaming website via an Internet browser of the personal gaming device or execute an application (commonly called an "app") installed on the personal gaming device before the user can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the user before enabling game play on the personal gaming device (or, in some embodiments, before enabling monetary wager-based game play on the personal gaming device). In these embodiments, the user must identify herself to the one or more servers, such as by inputting the user's unique username and password combination, providing an input to a biometric sensor (e.g., a fingerprint sensor, a retinal sensor, a voice sensor, or a facial-recognition sensor), or providing any other suitable information.

Once identified, the one or more servers enable the user to establish an account balance from which the user can draw credits usable to wager on plays of a game. In certain embodiments, the one or more servers enable the user to initiate an electronic funds transfer to transfer funds from a bank account to the user's account balance. In other embodiments, the one or more servers enable the user to make a payment using the user's credit card, debit card, or other suitable device to add money to the user's account balance. In other embodiments, the one or more servers enable the user to add money to the user's account balance via a peer-to-peer type application, such as PayPal or Venmo. The one or more servers also enable the user to cash out the user's account balance (or part of it) in any suitable manner, such as via an electronic funds transfer, by initiating creation of a paper check that is mailed to the user, or by initiating printing of a voucher at a kiosk in a gaming establishment.

In certain embodiments, the one or more servers include a payment server that handles establishing and cashing out users' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the user's account balance can cover the desired wager (i.e., includes a monetary balance at least equal to the desired wager).

If the payment server determines that the user's account balance cannot cover the desired wager, the payment server notifies the game server, which then instructs the personal gaming device to display a suitable notification to the user that the user's account balance is too low to place the desired wager. If the payment server determines that the user's account balance can cover the desired wager, the payment server deducts the desired wager from the account balance and notifies the game server. The game server then determines an outcome and any associated award for the play of the game. The game server notifies the payment server of any nonzero award, and the payment server increases the user's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the user to play games on the EGM remotely via the personal gaming device. In certain embodiments, the gaming system includes a geo-fence system that enables tethered game play within a particular geographic area but not outside of that geographic area.

In certain embodiments, the gaming system is configured to communicate with a social network server that hosts or partially hosts a social networking website via a data network (such as the Internet) to integrate a user's gaming experience with the user's social networking account. This enables the gaming system to send certain information to the social network server that the social network server can use to create content (such as text, an image, and/or a video) and post it to the user's wall, newsfeed, or similar area of the social networking website accessible by the user's connections (and in certain cases the public) such that the user's connections can view that information. This also enables the gaming system to receive certain information from the social network server, such as the user's likes or dislikes or the user's list of connections. In certain embodiments, the gaming system enables the user to link the user's user account to the user's social networking account(s). This enables the gaming system to, once it identifies the user and initiates a gaming session (such as via the user logging in to a website (or an application) on the user's personal gaming device or via the user inserting the user's player tracking card into an EGM), link that gaming session to the user's social networking account(s). In other embodiments, the gaming system enables the user to link the user's social networking account(s) to individual gaming sessions when desired by providing the required login information.

For instance, in one embodiment, if a user wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the user's wall (or other suitable area) of the social networking website for the user's connections to see (and to entice them to play). In another embodiment, if a user joins a multiuser game and there is another seat available, the gaming system sends that information to the social network sever to enable the server to create associated content (such as text indicating a vacancy for that particular game) and to post that content to the user's wall (or other suitable area) of the social networking website for the user's connections to see (and to entice them to fill the vacancy). In another embodiment, if the user consents, the gaming system sends advertisement information or offer information to the social network server to enable the social network server to create associated content (such as text or an image reflecting an advertisement and/or an offer) and to post that content to the user's wall (or other suitable area) of the social networking website for the user's connections to see. In another embodiment, the gaming system enables the user to recommend a game to the user's connections by posting a recommendation to the user's wall (or other suitable area) of the social networking website.

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the user, the EGM stores the pre-power failure state in a non-volatile memory, returns to that state upon restoration of power, and provides the award to the user. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a user of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the user's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a user is required to make a number of selections on a video display screen. When a malfunction has occurred after the user has made one or more selections, the EGM may be restored to a state that shows the graphical presentation just before the malfunction including an indication of selections that have already been made by the user. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a user may decide that in a previous game of chance that they did not receive credit for an award that they believed they won. The game history information may be used to reconstruct the state of the EGM before, during, and/or after the disputed game to demonstrate whether the user was correct or not in the user's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms “a”, “an” and “the” are intended to include the plural forms as well, unless the context clearly indicates otherwise. In another example, the terms “including” and “comprising” and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term “and/or” includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A method of operating a gaming system for providing a play of a game, said method comprising:

randomly determining, via a processor, a plurality of symbols;

communicating, via the processor, data that results in a display, by a display device, of the plurality of symbols;

determining, via the processor, any awards associated with any winning symbol combinations formed by the plurality of symbols;

communicating, via the processor, data that results in a display, by the display device, of any determined awards;

responsive to any of the winning symbol combinations comprising a tracked symbol, adding, via the processor, a quantity of occurrences of the tracked symbol in any of the winning symbol combinations to a tracked quantity of the tracked symbol; and responsive to the tracked quantity of that tracked symbol reaching a threshold quantity for the tracked symbol:

communicating, via the processor, data that results in a display, by the display device, of a replacement of each of a plurality of the occurrences of the tracked symbol of the displayed plurality of symbols with a replacement symbol, determining, via the processor, any additional awards associated with the displayed plurality of symbols comprising the displayed replacement symbols, and communicating, via the processor, data that results in a display, by the display device, of any determined additional awards.

2. The method of claim 1, wherein the game is a slot game comprising a plurality of reels and the plurality of symbols are on the plurality of reels.

3. The method of claim 1, which comprises, responsive to the tracked quantity of the tracked symbol reaching the threshold quantity for the tracked symbol, communicating, via the processor, data that results in a display, by the display device, of a replacement of each occurrence of the tracked symbols of the plurality of displayed symbols with the replacement symbol.

4. The method of claim 1, wherein the replacement symbol is a wild symbol.

5. The method of claim 1, which comprises, responsive to any of the winning symbol combinations comprising the tracked symbol, adding, via the processor, a quantity of occurrences of the tracked symbols in all of the winning symbol combinations to the tracked quantity of the tracked symbol.

6. The method of claim 1, which comprises, responsive to the tracked quantity of the tracked symbol not reaching the threshold quantity for the tracked symbol, enabling, via the processor, a subsequent play of the game wherein the tracked quantity of the track symbol persist for the subsequent play of the game.

7. The method of claim 1, which comprises, responsive to the tracked quantity of the tracked symbol reaching the threshold quantity for the tracked symbol, resetting, via the processor, the tracked quantity of the track symbol for a subsequent play of the game.

8. The method of claim 1, which comprises communicating, via the processor, data that results in a display, by the display device, of the tracked quantity of the tracked symbol before and during the play of the game.

9. A method of operating a gaming system for providing a play of a game, the method comprising:

randomly determining, via a processor, a plurality of symbols;

communicating, via the processor, data that results in a display, by a display device, of the plurality of symbols;

determining, via the processor, any awards associated with any winning symbol combinations formed by the plurality of symbols;

communicating, via the processor, data that results in a display, by the display device, of any determined awards;

responsive to any of the winning symbol combinations comprising any of a plurality of different tracked symbols, for each such tracked symbol, adding, via the processor, a quantity of occurrences of that tracked symbol in any of the winning symbol combinations including that tracked symbol to a tracked quantity of that tracked symbol; and responsive to any of the tracked quantities of the tracked symbols reaching a threshold quantity for that tracked symbol:

communicating, via the processor, data that results in a display, by the display device, of a replacement of each of a plurality of that tracked symbol with a replacement symbol, determining, via the processor, any additional awards associated with the displayed plurality of symbols comprising the displayed replacement symbols, and communicating, via the processor, data that results in a display, by the display device, of any determined additional awards.

10. The method of claim 9, wherein the replacement symbol is a wild symbol.

11. The method of claim 9, which comprises, responsive to the tracked quantities of the tracked symbols not respectively reaching the threshold quantities for the tracked symbols, enabling, via the processor, a subsequent play of the game wherein the tracked quantities of the track symbols persist for the subsequent play of the game.

12. The method of claim 9, which comprises, responsive to the tracked quantity of one of the tracked symbols reaching the threshold quantity for that tracked symbol, resetting, via the processor, the tracked quantity of that tracked symbol for a subsequent play of the game and causing the tracked quantities of any of the other tracked symbols to persist for the subsequent play of the game.

13. The method of claim 9, which comprises, responsive to the tracked quantity of one of the tracked symbols reaching the threshold quantity for that tracked symbol, resetting, via the processor, the tracked quantities of all of the tracked symbols for a subsequent play of the game.

14. The method of claim 9, which comprises, communicating, via the processor, data that results in a display, by the display device of each of the tracked quantities of the tracked symbols before and during the play of the game.

15. A method of operating a gaming system for providing a play of a slot game, said method comprising:

communicating, via a processor, data that results in a display, by a display device, of a plurality of reels;

randomly determining, via the processor, a plurality of symbols from a plurality of different symbols on the reels, the plurality of different symbols comprising a tracked symbol;

communicating, via the processor, data that results in a display, by the display device, of the plurality of symbols on the reels;

determining, via the processor, any awards associated with any winning symbol combinations on the reels formed by the displayed plurality of symbols on the reels;

communicating, via the processor, data that results in a display, by the display device, of any determined awards;

responsive to any of the winning symbol combinations on the reels comprising the tracked symbol, adding, via the processor, a quantity of occurrences of the tracked symbol on the reels that are in any of the winning symbol combinations on the reels to a tracked quantity of the tracked symbol; and responsive to the tracked quantity of the tracked symbol reaching a threshold quantity for the tracked symbol:

communicating, via the processor, data that results in a display, by the display device, of a replacement of each occurrence of the tracked symbols on the reels that are in any of the winning symbol combinations with a wild replacement symbol, determining, via the processor, any additional awards associated with the displayed plurality of symbols on the reels that comprise the displayed wild replacement symbols, and communicating, via the processor, data that results in a display, by the display device, of any determined additional awards.

16. The method of claim 15, which comprises, responsive to the tracked quantity of the tracked symbol not reaching the threshold quantity for the tracked symbol, enabling, via the processor, a subsequent play of the game wherein the tracked quantity of the tracked symbol persist for the subsequent play of the game.

17. The method of claim 15, which comprises, responsive to the tracked quantity of the tracked symbol reaching the threshold quantity for the tracked symbol, resetting, via the processor, the tracked quantity of the tracked symbol for a subsequent play of the game.

18. The method of claim 15, which comprises, communicating, via the processor, data that results in a display, by the display device of the tracked quantity of the tracked symbol before and during the play of the game.

19. The method of claim 15, wherein the threshold quantity is greater than a quantity of the tracked symbol that can occur in a single play of the game.

20. The method of claim 15, which comprises, responsive to the tracked quantity of the tracked symbol reaching the threshold quantity for that tracked symbol, communicating, via the processor, data that results in a display, by the display device, of a replacement of each of the tracked symbols on the reels regardless of whether that occurrence of the tracked symbol is in any of the winning symbol combinations on the reels.

* * * * *